(12) United States Patent
Schlipf et al.

(10) Patent No.: US 10,836,471 B2
(45) Date of Patent: Nov. 17, 2020

(54) AIRCRAFT STRUCTURE COMPONENT FOR LAMINAR FLOW

(71) Applicant: Airbus Operations GmbH, Hamburg (DE)

(72) Inventors: Bernhard Schlipf, Hamburg (DE); Dort Daandels, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 366 days.

(21) Appl. No.: 15/799,336

(22) Filed: Oct. 31, 2017

(65) Prior Publication Data

US 2018/0134374 A1    May 17, 2018

(30) Foreign Application Priority Data

Nov. 16, 2016   (EP) .................................. 16199222

(51) Int. Cl.
*B64C 21/10*      (2006.01)
*B64C 23/00*      (2006.01)
(Continued)

(52) U.S. Cl.
CPC .............. *B64C 21/10* (2013.01); *B05B 12/28* (2018.02); *B05D 3/007* (2013.01); *B05D 3/12* (2013.01);
(Continued)

(58) Field of Classification Search
CPC .... B64C 21/10; B64C 23/005; B64C 2230/26
See application file for complete search history.

(56) References Cited

U.S. PATENT DOCUMENTS 4,949,920 A * 8/1990 Schindel ................... B64C 1/38
                                                          244/117 A
2014/0329055 A1  11/2014 Berry et al.
(Continued)

FOREIGN PATENT DOCUMENTS

DE            930724 C      7/1955
EP          2743005 A1      6/2014
(Continued)

OTHER PUBLICATIONS

Extended European Search Report for Application No. 16199222.7 dated Apr. 28, 2017.
(Continued)

*Primary Examiner* — Nicholas McFall
(74) *Attorney, Agent, or Firm* — Jenkins, Wilson, Taylor & Hunt, P.A.

(57) ABSTRACT

An aircraft structure component for laminar flow, the aircraft structure component having an outer skin with an aerodynamic surface, wherein the aerodynamic surface has a leading edge portion and a downstream portion adjacently downstream from the leading edge portion, and wherein the downstream portion of the aerodynamic surface includes a paint layer that is not present in the leading edge portion, so that an edge line is formed between the leading edge portion and the downstream portion by the beginning paint layer. An object, to provide an aircraft structure component that allows for a reduced aerodynamic drag, is achieved in that the edge line has a ramp-shaped cross section, wherein the thickness of the paint layer increases from a starting point over a predetermined ramp length to a saturation point where the full thickness of the paint layer is reached.

17 Claims, 5 Drawing Sheets

(51) Int. Cl.
    *B05D 3/00*    (2006.01)
    *B05D 5/00*    (2006.01)
    *B05D 3/12*    (2006.01)
    *B05B 12/28*   (2018.01)
    *B64C 3/26*    (2006.01)
    *B64C 5/02*    (2006.01)

(52) U.S. Cl.
    CPC .............. *B05D 5/00* (2013.01); *B64C 23/005* (2013.01); *B64C 3/26* (2013.01); *B64C 5/02* (2013.01); *B64C 2230/00* (2013.01); *Y02T 50/166* (2013.01)

(56) References Cited

U.S. PATENT DOCUMENTS

2016/0052621 A1    2/2016   Ireland et al.
2017/0253321 A1*  9/2017   Rolston .................. B64C 30/00

FOREIGN PATENT DOCUMENTS

WO   WO 2007/017290 A1   2/2007
WO   WO 2008/002498 A1   1/2008

OTHER PUBLICATIONS

Kepler22b, "Why are the leading edges of the 787's horizontal and vertical stabilizers not painted?," Aviation Stack Exchange, XP055365249, URL:https://aviation.stackexchange.com/questions/25136/why-are-the-leading-edges-of-the-787s-horizontal-and-vertical-stabilizers-not-p [retrieved on Apr. 18, 2017], pp. 1-4, dated Feb. 29, 2016.

Chinese Office Action for Application No. 201711005730.0 dated Jul. 17, 2020.

* cited by examiner

AIRCRAFT STRUCTURE COMPONENT FOR LAMINAR FLOW

CROSS-REFERENCE TO RELATED APPLICATION

This application claims priority to European Patent Application No. 16199222.7 filed Nov. 16, 2016, the entire disclosure of which is incorporated by reference herein.

TECHNICAL FIELD

The present disclosure relates to an aircraft structure component for laminar flow, such as a wing, a slat, a droop nose, a horizontal tail plane, or a vertical tail plane or parts of the same. The aircraft structure component has an outer skin with an aerodynamic surface. The aerodynamic surface is referred to as the outer surface of the aircraft structure component that is in contact with the aerodynamic flow circulating around the aircraft structure component.

BACKGROUND

The aerodynamic surface has a leading edge portion and a downstream portion. The leading edge portion is directed towards the incoming flow during flight of the associated aircraft, and is adapted for a laminar flow circulating along the leading edge portion. The downstream portion is located adjacently downstream from the leading edge portion with respect to the incoming flow. The downstream portion of the aerodynamic surface comprises a paint layer that is not present in the leading edge portion. As an alternative to the paint layer a foil layer might be provided in the downstream portion. Although hereinafter it is referred to a paint layer only, the present specification also applies to a foil layer instead of a paint layer. The foil layer is attached to the downstream portion of the aerodynamic surface, preferably by an adhesive. The leading edge portion can be entirely unpainted or can have some sort of paint, while in any case the paint layer referred to in here that is present in the downstream portion does not extend over the leading edge portion. In such a way, an edge line is formed between the leading edge portion of the aerodynamic surface and the downstream portion by the beginning paint layer. The term "edge line" refers to a more global perspective where the edge line extends as a line transverse the incoming flow. However, at a closer look, the edge line is more of an edge region that has a distinct extension in the direction of the incoming flow, instead of being infinitely thin as the term "line" ideally supposes. In other words, the edge line relates to the thickness jump where the paint layer begins at the transmission from the leading edge portion to the downstream portion, which thickness jump proceeds as a line across the direction of the incoming flow along the aerodynamic surface of the aircraft structure component, i.e. of the wing, the slat, etc.

Similar aircraft structure components are known from the prior art. It has been found advantages, in particular due to erosion of the paint in the leading edge portion, to apply the paint layer only in the downstream portion of the aerodynamic surface while omitting the paint layer in the leading edge portion upstream from the downstream portion. This is usually done by a foil or a cover covering the leading edge portion when the aerodynamic surface is painted, so that the paint layer is present only in the downstream portion but not in the leading edge portion after the cover is removed. However, this procedure leaves the edge line in the form of a thickness jump at the aerodynamic surface between the unpainted leading edge portion and the painted downstream portion. Such a thickness jump increases the aerodynamic drag of the aircraft structure component, as it negatively influences the laminar flow present at the leading edge portion.

SUMMARY

Accordingly, an object of the present disclosure is to provide an aircraft structure component that allows for a reduced aerodynamic drag.

This object is achieved in that the edge line has a ramp-shaped cross section, when viewed along the incoming flow and across the aerodynamic surface. The ramp-shaped cross section is formed such that the thickness of the paint layer increases from a starting point where the paint layer begins, over a predetermined ramp length measured along the incoming flow, to a saturation point where the full thickness of the paint layer is reached.

By such a ramp-shaped cross section of the edge line, the laminar flow from the unpainted leading edge portion can proceed to the painted downstream portion without being considerably interrupted and turning into turbulent flow, thereby essentially reducing the aerodynamic drag of the aircraft structure component. Further, such a ramp-shaped cross section is more resistant against erosion.

According to a preferred embodiment, the ramp length is at least as great as the full thickness of the paint layer at the saturation point. I.e. the ramp angle is preferably 45 degrees or smaller. Preferably, the ramp length is between one and twenty times as great, further preferred between two and ten times as great, further preferred about five times as great as the full thickness of the paint layer at the saturation point. In such a way, the negative effect of the edge line with respect to the laminar flow is minimized.

According to another preferred embodiment, the ramp-shaped cross section of the edge line has a linear course, so that the thickness of the paint layer increases linearly from the starting point to the saturation point. In such a way, the ramp-shaped cross section is easy to manufacture, while the negative effect of the edge line on the laminar flow is considerably low.

According to an alternative preferred embodiment, the ramp-shaped cross section of the edge line has a curved course, so that the thickness of the paint layer increases nonlinearly from the starting point to the saturation point with an increasing and/or decreasing slope. In particular, it is preferred that the ramp-shaped cross section of the edge line has a double-curved course, so that the thickness of the paint layer increases from the starting point to the saturation point with an increasing slope followed by a decreasing slope. In such a manner, the thickness of the paint layer increases continuously from the unpainted leading edge portion to the downstream portion with the full thickness paint layer, thereby minimizing the negative effect of the edge line on the laminar flow.

According to another preferred embodiment, the edge line has a straight course along the aerodynamic surface in a direction transverse the incoming flow. In particular, it is preferred that the angle between the course of the edge line and the direction of the incoming flow is greater than 30 degrees. By such an angular course of the edge line with respect to the incoming flow, it is guaranteed that cross flow instabilities are avoided and a laminar flow is maintained.

According to an alternative preferred embodiment, the edge line, at least at the starting point, has a periodically curved course along the aerodynamic surface in a direction transverse the incoming flow. It is particularly preferred that the edge line, at least at the starting point of the cross section, has a sinusoidal course along the aerodynamic surface in a direction transverse the incoming flow. Such a periodically curved, in particular sinusoidal, course allows that a fastener or a row of fasteners present in the aerodynamic surface can be circumvented by the edge line, so that the edge line does not need to cross a fastener. The edge line crossing a fastener is undesired, because the edge line would be interrupted or distorted, thereby negatively effecting the laminar flow.

In particular, it is preferred that the angle between the direction of the incoming flow and a tangent to an inflection point present in the course of the edge line, preferably a tangent to any inflection point present in the course of the edge line, is greater than 30 degrees. In such a way, cross flow instabilities are avoided and laminar flow is maintained.

It is particularly preferred, that all angles between the direction of the incoming flow and the tangents to the inflection points present in the course of the edge line are equally great. In such a way, a more homogeneous flow distribution along the edge line is achieved.

According to yet another preferred embodiment, the course of the edge line defines a plurality of fore peaks and a plurality of aft peaks, with respect to the direction of the incoming flow. I.e. the fore peaks point towards the incoming flow and the aft peaks point away from the incoming flow. It is preferred that at an aft peak, the ramp length is as great as the full thickness of the paint layer at the saturation point. Preferably, at the same time at an adjacent fore peak adjacent to the aft peak, the ramp length is between twice and twenty times as great as the full thickness of the paint layer at the saturation point. Preferably, at an aft peak the ramp length is as great as the full thickness of the paint layer at the saturation point, while preferably, at an adjacent fore peak, the ramp length is between five and ten times as great as the full thickness of the paint layer at the saturation point. By such a development of the slope of the ramp-shaped cross section from the fore peak to the aft peak, a smooth transition from the leading edge portion to the downstream portion is achieved, where the laminar flow is negatively affected by a minimum.

A further aspect of the present disclosure relates to a method for producing an aircraft structure component for laminar flow, in particular an aircraft structure component according to any of the afore described embodiments. The method comprises the following steps: First, an aircraft structure component having an outer skin with an aerodynamic surface is provided. The aerodynamic surface has a leading edge portion directed towards the incoming flow and a downstream portion adjacently downstream from the leading edge portion with respect to the incoming flow. Second, a paint layer is applied onto the downstream portion of the aerodynamic surface without applying the paint layer also to the leading edge portion. As an alternative to the paint layer, a foil layer might be applied in the downstream portion. Although hereinafter it is referred to a paint layer only, the present specification also applies to a foil layer instead of a paint layer. The foil layer is attached to the downstream portion of the aerodynamic surface, preferably by an adhesive. In such a way, an edge line is formed between the leading edge portion and the downstream portion by the beginning paint layer. Finally, the paint layer is processed along the edge line, such that the edge line has a ramp shape cross section, when viewed along the incoming flow. Preferably, at the ramp shape cross section, the thickness of the paint layer increases from a starting point at the beginning of the paint layer over a predetermined ramp length along the incoming flow to a saturation point, where the full thickness of the paint layer is reached. Preferably, the paint layer is processed along the edge line by removing material of the paint layer, wherein the material is preferably removed by grinding, polishing or by a laser treatment, such as laser ablation.

By such a method, an aircraft structure component can be produced which allows for a minimum negative effect the edge line has on the laminar flow. The features, effects and advantages mentioned in connection with the aircraft structure component also apply to the method for producing the aircraft structure component, correspondingly.

BRIEF DESCRIPTION OF THE DRAWINGS

Preferred embodiments of the present disclosure are described hereinafter in more detail by example drawings, where.

DETAILED DESCRIPTION

Figure 1:
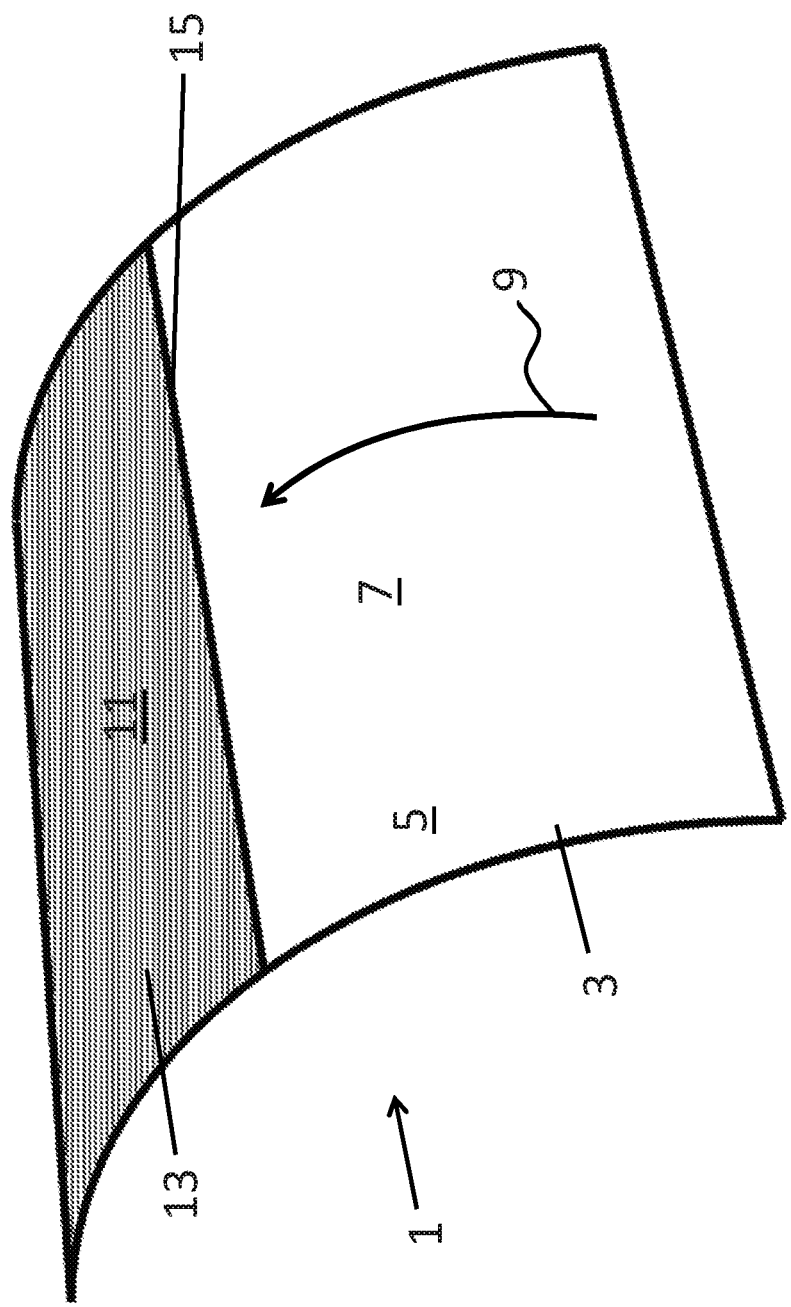
FIG. 1 is a perspective view of an aircraft structure component according to a first embodiment of the present disclosure.
Figure 2:
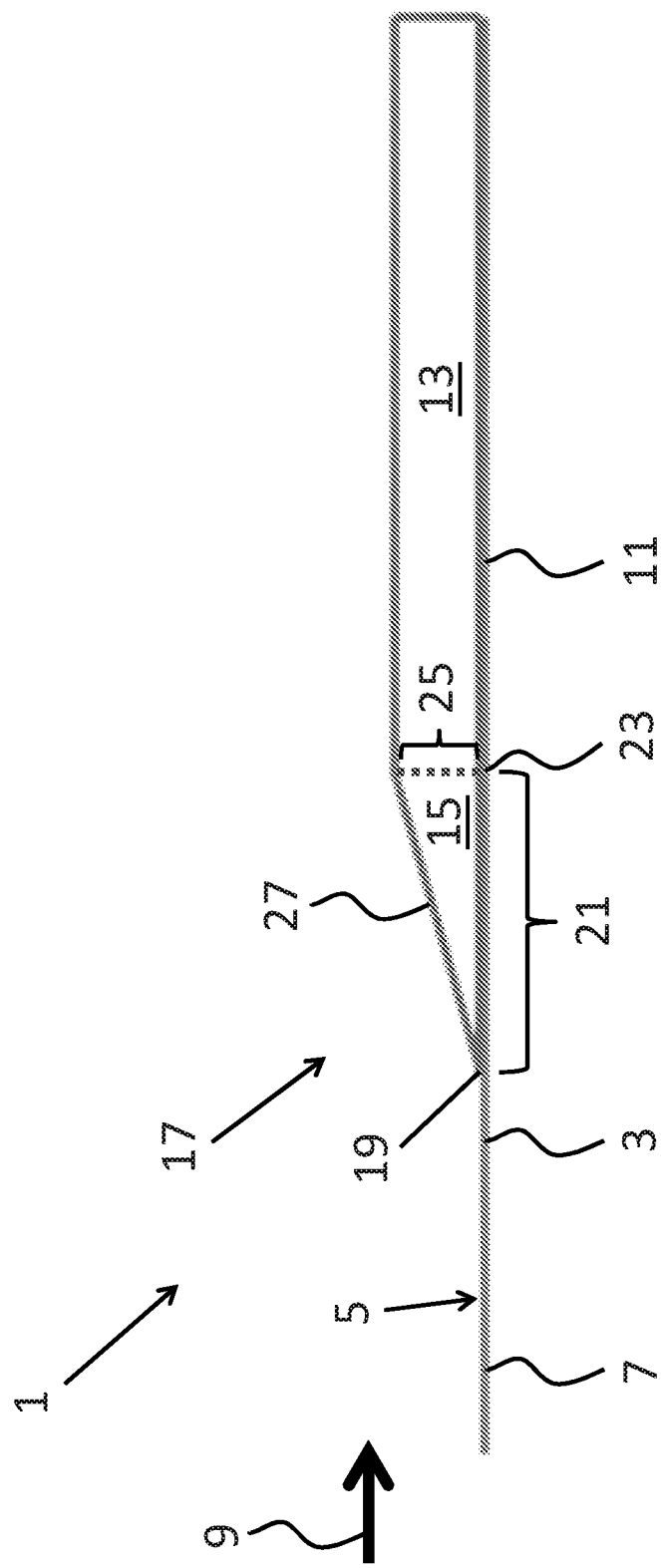
FIG. 2 is a schematic cross-sectional view of the aircraft structure component of FIG. 1, wherein the edge line has a linear ramp-shaped cross section.

In FIG. 1, a first embodiment of an aircraft structure component 1 for laminar flow is shown, in the present embodiment a slat. The aircraft structure component 1 has an outer skin 3 with an aerodynamic surface 5 adapted to be in contact with an aerodynamic flow. The aerodynamic surface 5 has a leading edge portion 7 that is directed towards the incoming flow 9 of an associated aircraft during flight and that is, thus, adapted for a laminar flow. The aerodynamic surface 5 further has a downstream portion 11 adjacently downstream from the leading edge portion 7 with respect to the incoming flow 9. The downstream portion 11 of the aerodynamic surface 5 comprises a paint layer 13 that is not present in the unpainted leading edge portion 7, so that an edge line 15 in the form of a thickness jump is present between the leading edge portion 7 and the downstream portion 11 by the beginning paint layer 13, wherein the edge line 15 extends transverse the incoming flow 9. As shown in FIG. 2, the edge line 15 has a ramp-shaped cross section 17 along the incoming flow 9, wherein the thickness of the paint layer 13 increases from a starting point 19 where the paint layer begins over a predetermined ramp length 21 in the direction of the incoming flow 9 to a saturation point 23 where the full thickness 25 of the paint layer 13 is reached.

As also shown in FIG. 2, the ramp length 21 is about three times as great as the full thickness 25 of the paint layer 13 at the saturation point 23. FIG. 2 also shows that the ramp-shaped cross section 17 of the edge line 15 has a linear course 27, so that the thickness of the paint layer 13 increases linearly from the starting point 19 to the saturation point 23.

Figure 3:
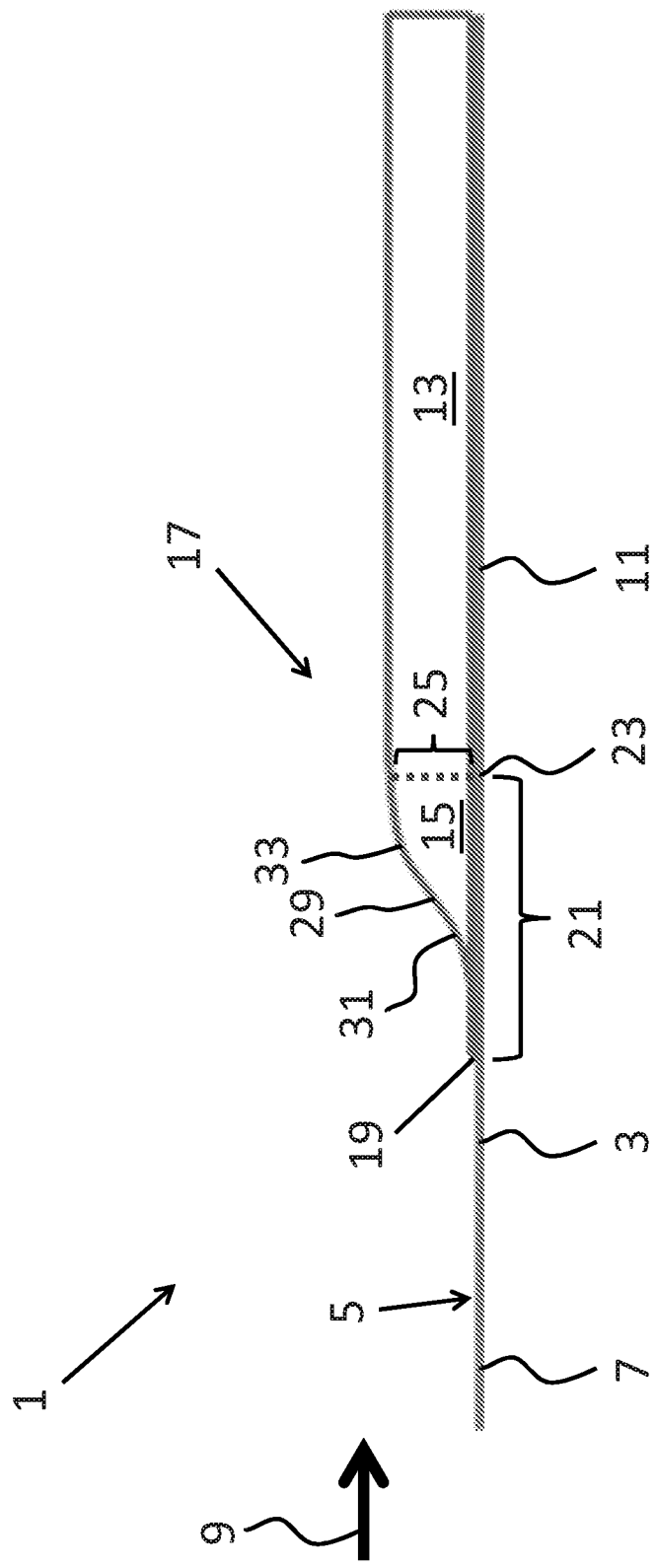
FIG. 3 is a schematic cross-sectional view of a second embodiment of the aircraft structure component according to the disclosure herein, wherein the edge line has a double-curved ramp-shaped cross section.

In an alternative embodiment shown in FIG. 3, the ramp-shaped cross section 17 of the edge line 15 has a curved course, in particular a double-curved course 29, so that the thickness of the paint layer 13 increases from the starting point 19 to the saturation point 23 with an increasing slope 31 followed by a decreasing slope 33.

Figure 4:
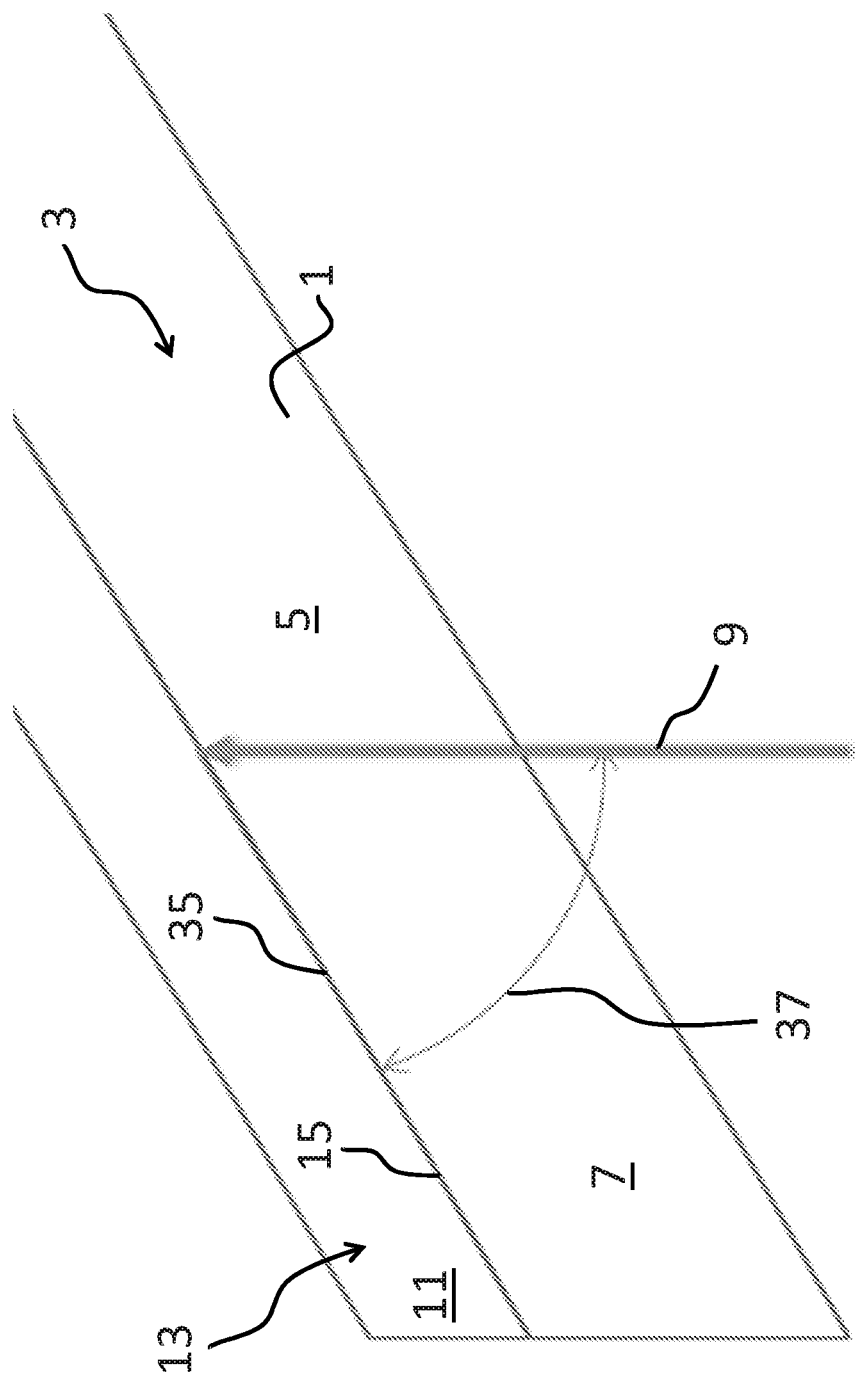
FIG. 4 a schematic top view of the aircraft structure component of FIG. 1 relative to the incoming flow, wherein the edge line has a straight course.

As shown in FIG. 4, the edge line 15 has a straight course 35 along the aerodynamic surface 5 in a direction transverse the incoming flow 9. The angle 37 between the course of the edge line 15 and the direction of the incoming flow 9 is greater than 30 degrees, in the present embodiment about 60 degrees.

Figure 5:
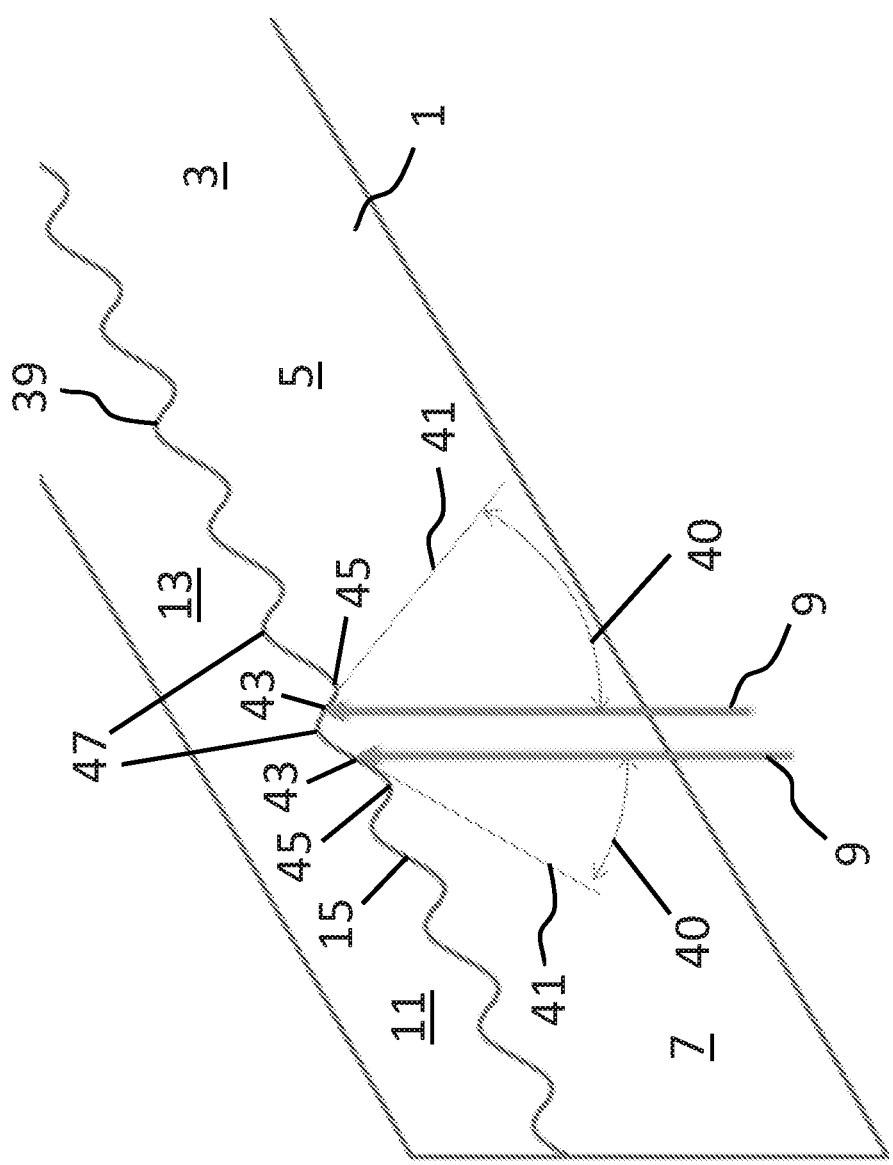
FIG. 5 a schematic top view of a third embodiment of an aircraft structure component according to the present disclosure, wherein the edge line has a sinusoidal course.

According to an alternative embodiment shown in FIG. 5, the edge line 9 has a periodically curved course, in particular a sinusoidal course 39 along the aerodynamic surface 5 transverse the incoming flow 9. The angle 40 between the direction of the incoming flow 9 and a tangent 41 to any inflection point 43 present in the course of the edge line 15 is greater than 30 degrees, in the present embodiment between 30 and 45 degrees. It might also be preferred that all angles 40 between the direction of the incoming flow 9 and the tangents 41 to the inflection points 43 present in the course of the edge line 15 are equally great. In the embodiment shown in FIG. 5, the course of the edge line 15 defines a plurality of fore peaks 45 and a plurality of aft peaks 47 with respect to the direction of the incoming flow 9. While at an aft peak 47 the ramp length 21 is as great as the full thickness 25 of the paint layer 13 at the saturation point 23, at an adjacent fore peak 45 the ramp length 21 is between twice and twenty times, in the present embodiment five times as great as the full thickness of the paint layer 13 at the saturation point 23.

The aircraft structure components 1 as shown in FIGS. 1 through 5 can be produced in the following manner: First, an aircraft structure component 1 having an outer skin 3 with an aerodynamic surface 5 is provided, wherein the aerodynamic surface 5 has a leading edge portion 7 and a downstream portion 11 adjacently downstream from the leading edge portion 7 with respect to the incoming flow 9. Subsequently, a paint layer 13 is applied onto the downstream portion 11 of the aerodynamic surface 5 without applying the paint layer 13 also to the leading edge portion 7, so that an edge line 15 is formed between the leading edge portion 7 and the downstream portion 11 by the beginning paint layer 13. Finally, the paint layer 13 is processed along the edge line 15 by removing the material of the paint layer 13 through grinding, polishing or laser treatment, such that the edge line 15 has a ramp-shaped cross section 17 along the incoming flow 9, where the thickness of the paint layer 13 increases from a starting point 19 over a predetermined ramp length 21 to a saturation point 23, where the full thickness 25 of the paint layer 13 is reached.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft structure component for laminar flow, the aircraft structure component having an outer skin with an aerodynamic surface,
   wherein the aerodynamic surface has a leading edge portion and a downstream portion adjacently downstream from the leading edge portion, and
   wherein the downstream portion of the aerodynamic surface comprises a paint layer or a foil layer that is not present in the leading edge portion, so that an edge line is formed between the leading edge portion and the downstream portion by the beginning paint layer or foil layer, and
   wherein the edge line has a ramp-shaped cross section, wherein a thickness of the paint layer or foil layer increases from a starting point over a predetermined ramp length to a saturation point where a full thickness of the paint layer or foil layer is reached.

2. The aircraft structure component according to claim 1, wherein the ramp length is at least as great as the full thickness of the paint layer or foil layer at the saturation point.

3. The aircraft structure component according to claim 1, wherein the ramp-shaped cross section of the edge line has a linear course, so that thickness of the paint layer or foil layer increases linearly from the starting point to the saturation point.

4. The aircraft structure component according to claim 1, wherein the ramp-shaped cross section of the edge line has a curved course, so that the thickness of the paint layer or foil layer increases nonlinearly from the starting point to the saturation point with an increasing slope or a decreasing slope.

5. The aircraft structure component according to claim 4, wherein the ramp-shaped cross section of the edge line has a double-curved course, so that the thickness of the paint layer or foil layer increases from the starting point to the saturation point with an increasing slope followed by a decreasing slope.

6. The aircraft structure component according to claim 1, wherein the edge line has a straight course along the aerodynamic surface.

7. The aircraft structure component according to claim 6, wherein an angle between the course of the edge line and a direction of incoming flow is greater than 30°.

8. The aircraft structure component according to claim 1, wherein the edge line has a periodically curved course along the aerodynamic surface.

9. The aircraft structure component according to claim 8, wherein the edge line has a sinusoidal course along the aerodynamic surface.

10. The aircraft structure component according to claim 8, wherein an angle between a direction of incoming flow and a tangent to an inflection point present in the course of the edge line, is greater than 30°.

11. The aircraft structure component according to claim 8, wherein all angles between a direction of incoming flow and tangents to the inflection points present in the course of the edge line are equal.

12. The aircraft structure component according to claim 8, wherein the course of the edge line defines a plurality of fore peaks and a plurality of aft peaks with respect to a direction of the incoming flow, wherein, while at an aft peak the ramp length is as great as full thickness of the paint layer or foil layer at the saturation point, at an adjacent fore peak the ramp length is between twice and 20 times as great as full thickness of the paint layer or foil layer at the saturation point.

13. The aircraft structure component according to claim 12, wherein, while at an aft peak the ramp length is as great as the full thickness of the paint layer or foil layer at the saturation point, at an adjacent fore peak the ramp length is between 5 and 10 times as great as the full thickness of the paint layer or foil layer at the saturation point.

14. A method for producing an aircraft structure component for laminar flow, the method comprising:
    providing an aircraft structure component having an outer skin with an aerodynamic surface, wherein the aerodynamic surface has a leading edge portion and a downstream portion adjacently downstream from the leading edge portion;
    applying a paint layer or foil layer onto the downstream portion of the aerodynamic surface without applying the paint layer or foil layer also to the leading edge portion, so that an edge line is formed between the leading edge portion and the downstream portion by the beginning paint layer or foil layer; and
    processing the paint layer or foil layer along the edge line, such that the edge line has a ramp-shaped cross section, wherein a thickness of the paint layer or foil layer increases from a starting point over a predetermined ramp length to a saturation point where the full thickness of the paint layer or foil layer is reached.

15. The method according to claim 14, wherein the paint layer or foil layer is processed along the edge line by removing material of the paint layer or foil layer.

16. The method according to claim 15, wherein the material of the paint layer or foil layer is removed by grinding, polishing, or laser treatment.

17. The method according to claim 16, wherein the laser treatment comprises laser ablation.

* * * * *